(12) United States Patent
Lee et al.

(10) Patent No.: US 9,482,014 B2
(45) Date of Patent: Nov. 1, 2016

(54) CHOCK FOR PAVER SUPPORT

(71) Applicant: ELMICH PTE LTD, Singapore (SG)

(72) Inventors: Alan Sian Ghee Lee, Singapore (SG); Henry Greaves, Watsons Bay (AU)

(73) Assignee: ELMICH PTE LTD., Singapore (SG)

( * ) Notice: Subject to any disclaimer, the term of this patent is extended or adjusted under 35 U.S.C. 154(b) by 96 days.

(21) Appl. No.: 14/389,971

(22) PCT Filed: Apr. 3, 2013

(86) PCT No.: PCT/AU2013/000347
§ 371 (c)(1),
(2) Date: Oct. 1, 2014

(87) PCT Pub. No.: WO2013/149299
PCT Pub. Date: Oct. 10, 2013

(65) Prior Publication Data
US 2015/0053835 A1  Feb. 26, 2015

(51) Int. Cl.
*F16M 11/24* (2006.01)
*E04F 15/02* (2006.01)
(Continued)

(52) U.S. Cl.
CPC ......... *E04F 15/02044* (2013.01); *E01C 3/006* (2013.01); *E01C 5/001* (2013.01); *E01C 11/12* (2013.01); *E04B 5/08* (2013.01); *E04D 1/34* (2013.01); *E04D 11/007* (2013.01);
(Continued)

(58) Field of Classification Search
USPC .................. 248/188.2, 346.05, 346.06, 679
See application file for complete search history.

(56) References Cited

U.S. PATENT DOCUMENTS 2,709,571 A * 5/1955 Mafera ..................... F16M 7/00
248/188.2
2,819,037 A * 1/1958 Wilkin ..................... B23Q 1/58
248/188.2

(Continued)

FOREIGN PATENT DOCUMENTS

AU     200020836    3/2000
AU      760000     5/2003
(Continued)

*Primary Examiner* — Bradley Duckworth

(57) ABSTRACT

A vertically-adjustable support structure (10) for supporting paving slabs or the like includes a base plate (20) on which four wedge-like support blocks (30) are provided. Each support block (30) has an inclined surface defining a series of teeth/steps, and a horizontal top surface. A chock (40) is placed on top of each support block (30) to support a corner of a paving slab. Each chock includes an upper support surface (70) for supporting the paving slab, and a sloped underside (280) which defines teeth (290) which engage the teeth of the support block and secures each chock against displacement towards the base plate. Moving the chock up or down the inclined surface adjusts the height of the support structure. Additional height adjustment is provided by adjusting the height of the chocks themselves. In particular, each chock includes wings (320) which are hinged to the sides of the chock. In one orientation with the side elements disposed on opposed sides of the chock the chock has a first height. In a second orientation, the side elements (320) are rotated about hinges (330) through 180° so that the surface which was uppermost in the first orientation is located on top of the upper surface of the chock, with the height of the chock increased by the depth of the side elements. The side elements preferably include means (340, 350; 360, 370, 380, 390) to lock them together and/or to the upper surface of the chock in the second orientation.

15 Claims, 8 Drawing Sheets

(51) Int. Cl.
*E01C 5/00* (2006.01)
*E04D 11/00* (2006.01)
*E01C 3/00* (2006.01)
*E01C 11/12* (2006.01)
*E04B 5/08* (2006.01)
*E04D 1/34* (2006.01)

(52) U.S. Cl.
CPC ...... *E01C 5/005* (2013.01); *E04D 2001/3408* (2013.01); *E04D 2001/3438* (2013.01); *E04F 15/02* (2013.01); *E04F 2015/02127* (2013.01)

(56) References Cited

U.S. PATENT DOCUMENTS

| | | | |
|---|---|---|---|
| 3,750,987 A | | 8/1973 | Göbel |
| 3,861,098 A | * | 1/1975 | Schaub ................. E01C 3/006 52/263 |
| 3,904,158 A | * | 9/1975 | Michael ................. F16M 5/00 248/149 |
| 4,220,378 A | | 9/1980 | Bienek |
| 4,281,739 A | * | 8/1981 | Keiser ................ B66B 11/004 181/207 |
| 4,436,268 A | * | 3/1984 | Schriever ............... B23Q 1/545 248/188.2 |
| 4,858,865 A | * | 8/1989 | Schrepfer ................ F16M 7/00 248/188.2 |
| 5,110,082 A | | 5/1992 | Rowan, Jr. |
| 5,479,745 A | * | 1/1996 | Kawai ............... E04F 15/02464 52/126.1 |
| 5,815,992 A | * | 10/1998 | Wells .................. E04B 1/34352 248/188.2 |
| 7,140,156 B1 | * | 11/2006 | Lowe, Jr. .......... E04F 15/02183 411/457 |
| D557,830 S | * | 12/2007 | Lee .............................. D25/199 |
| 7,328,879 B1 | * | 2/2008 | Plangetis ................. F16M 7/00 248/188.1 |
| 7,717,395 B2 | * | 5/2010 | Rowan, Jr. ............... F16M 7/00 248/188.2 |
| 8,011,148 B2 | * | 9/2011 | Bertke ................ E04F 11/1812 52/263 |
| 8,453,391 B2 | * | 6/2013 | Tabibnia .......... E04F 15/02452 248/188.2 |
| 8,678,366 B2 | * | 3/2014 | Bowers .................... B25H 1/04 269/289 R |
| 8,733,031 B2 | * | 5/2014 | Knight, III ............ E04F 15/102 248/174 |
| 2008/0134591 A1 | | 6/2008 | Repasky |

FOREIGN PATENT DOCUMENTS

| | | |
|---|---|---|
| AU | 2010100928 | 8/2010 |
| FR | 2 528 482 | 6/1982 |
| FR | 2 528 482 | 12/1983 |
| GB | 2 111 556 | 7/1983 |
| WO | WO 2010/107680 | 9/2010 |

* cited by examiner

CHOCK FOR PAVER SUPPORT

CROSS-REFERENCE TO RELATED APPLICATIONS

The present application claims priority from Australian Provisional Patent Application No 2012901349 filed on 4 Apr. 2012, the content of which is incorporated herein by reference.

FIELD OF THE INVENTION

This invention relates to vertically adjustable support structures for supporting members such as pavers, paving slabs or roof bearing members, sometimes referred to as paver supports, and in particular to a chock for such a paver support.

BACKGROUND OF THE INVENTION

Various types of vertically-adjustable support structures exist for supporting pavers and the like. One particularly successful design is that shown in AU 760000 which is marketed by the applicant of the present application under the "VersiPave" trade mark. AU 760000 discloses four wedge-like support blocks distributed around a base plate. The wedge-like support blocks define inclined surfaces which define teeth. Chocks may be located at different positions and heights on the inclined surfaces. The chocks have an upper surface on which a paver may be supported and an inclined lower support surface which defines teeth which inter-engage with the teeth of the support blocks. The main drawback of existing vertically-adjustable support structures is the limited range of adjustment they provide, in some cases as little as 10 mm or so. This problem can be addressed by placing extenders underneath the support structures to provide additional height, although this has the disadvantage of requiring a further component.

The present invention aims to provide a improved vertically-adjustable support structure which can provide a greater degree of vertical adjustment.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

In a first broad aspect of the invention there is provided a support structure for supporting an upper member such as a paving slab, paver or the like in which the maximum height of the support structure can be raised by at least 80% and preferably 90% or 100% compared with its minimum height.

More specifically, in one aspect of the invention, there is provided a support structure for supporting an upper member such as a paving slab, paver or the like comprising;— a base member having an underside, and an upper-side, a plurality of support blocks being formed on the upper-side, each support block defining an inclined surface portion which is inclined relative to the underside and which includes first engagement means; and one or more chocks positionable on one of the inclined surfaces, each chock including an upper surface for supporting a paver or the like and a second engagement means for engaging the first engagement means and securing the chock against displacement towards the base member, and wherein the maximum height of the support structure can be raised by at least 80% and preferably 90-100% or more compared with its minimum height.

In a second aspect, the present invention provides a support structure for supporting an upper member such as a paving slab, paver or the like, the support structure comprising;

a base member having an underside, and an upper-side, a plurality of support blocks being formed on the upper-side, each support block defining an inclined surface portion which is inclined relative to the underside and which includes first engagement means; and one or more chocks positionable on one of the inclined surfaces, each chock including an upper surface for supporting a paver or the like and a second engagement means for engaging the first engagement means and securing the chock against displacement towards the base member, and wherein the chock includes a further element or elements, which are preferably integrally formed with the chock, which are locatable on top of the upper surface, the arrangement being such that when the element or elements are located on top of the upper surface the height of the chock is raised by the height of the element or elements and when the elements are not located on top of the upper surface the height of the chock is unchanged, thus increasing the range of different heights which may be provided by the support structure.

With the existing chock design referred to in the introduction, the height range is typically from a 24 mm minimum to about a 35 mm maximum. In contrast, in the present invention by enabling an increase in the height of the chock, the height range of the paver support is increased from 24 mm to about 45 mm, which is approaching a 100% height increase.

The further element or elements may be in the form of wings which are hinged to opposite sides of the chock adjacent its upper surface.

By hinging the elements to the chock, no additional separate components are required to provide the optional height increase of the chocks.

The wings may include fixing means for fixing the wings to each other or to the upper surface of the block when the wings are located on top of the support block.

The fixing means may comprise a slot defined on one side face of one wing and a protrusion projecting from the opposed side face of the other wing which locates in the slot.

In a preferred embodiment, a wall is defined one each side of each support block whose top slopes approximately at the same height and incline as the inclined surface of the support block. The top of each wall may define a flange which extends towards the support block. Projections may extend from either side of the chocks arranged so that when the chocks are located on a support block the projections locate below flanges thus helping to retain the chocks on the support blocks. A gap in the flanges may be provided at the top of the wall to assist in mounting the chocks on the support blocks.

A series of a narrow cylindrical "pinholes" may be defined in each inclined surface of the base member. A cylindrical pin may be mounted in the underside of one or more chocks and used to pin/fix the chock to the inclined surface.

Typically, the first and second engagement means consist of interlocking teeth.

In a preferred embodiment the base member is divided into four sections joined by frangible connectors, each section including one support block and guides for positioning the base member relative to the upper members.

Typically, a circular hole is defined in the centre of the base member.

Advantageously, the present invention may provide an improved vertically-adjustable support structure which provides more vertical adjustment, without significantly increasing the complexity of the system or requiring additional components over and above a base support structure with adjustment chocks.

In a related aspect, the present invention may also provide a chock for use with a base member of a paver support, the chock including an upper surface for supporting a paver or the like and a second engagement means for engaging a first engagement means of the base member and securing the chock against displacement towards the base member, and wherein the chock includes a further element or elements locatable on top of the upper surface of the chock, the arrangement being such that when the element or elements are located on top of the upper surface the height of the chock is raised by the height of the element or elements and when the elements are not located on top of the upper surface the height of the chock is unchanged, thus increasing the range of different support heights which may be provided by the base member when the chock is mounted thereon.

BRIEF DESCRIPTION OF THE DRAWINGS

A specific embodiment of the invention will now be described, by way of example only, and with reference to the accompanying drawings, in which.

DETAILED DESCRIPTION OF A PREFERRED EMBODIMENT

Figure 1:
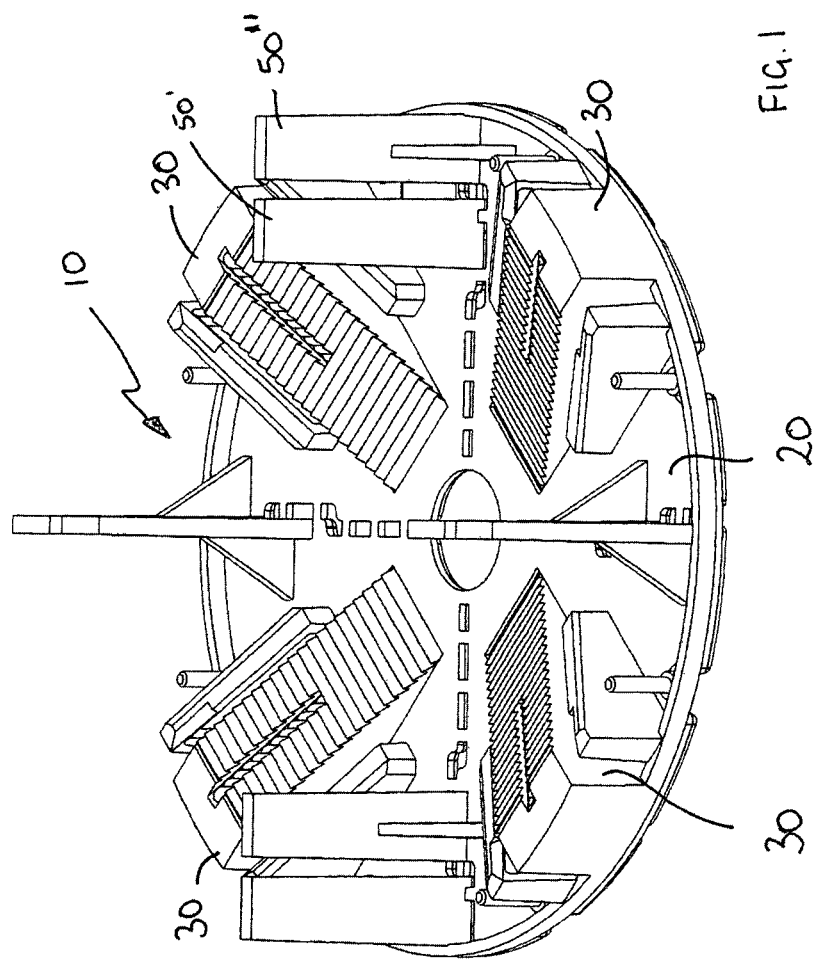
FIG. 1 shows an isometric view of base member of a support structure.
Figure 2:
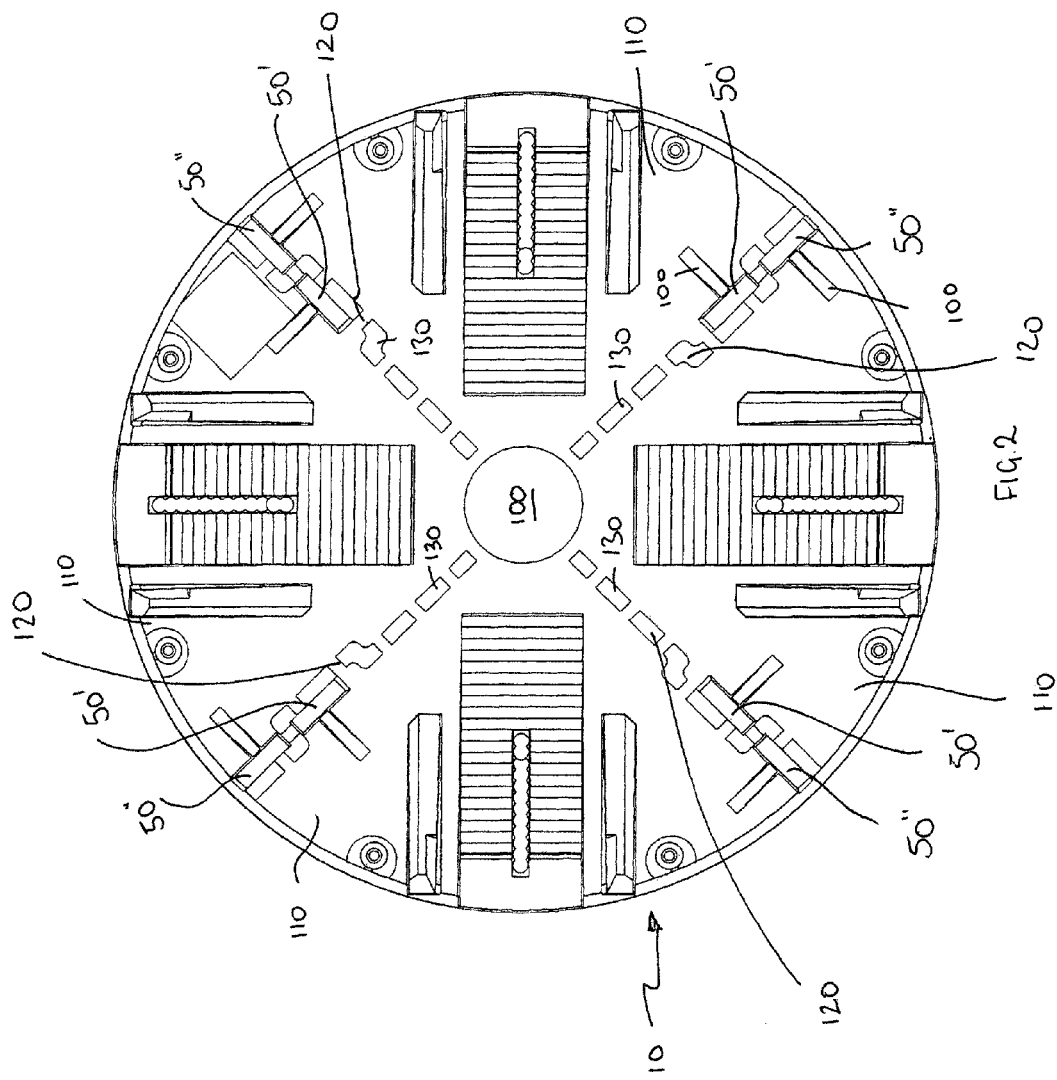
FIG. 2 is a top plan view of the base member of the support structure shown in FIG. 1.
Figure 3:
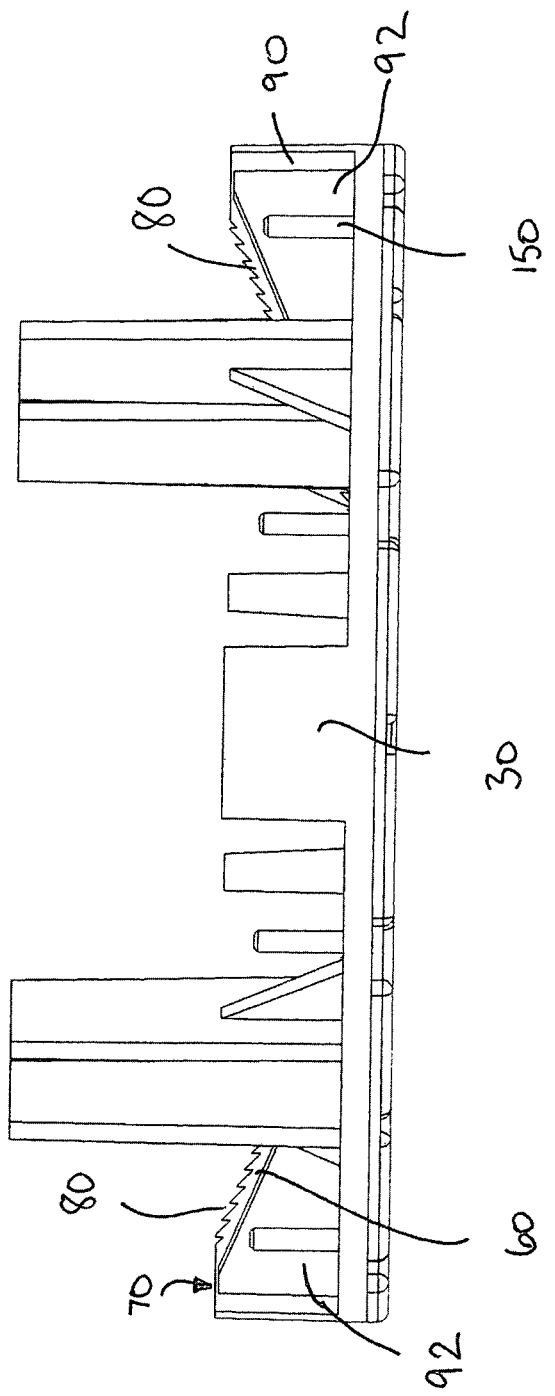
FIG. 3 is a side elevation of the base member of the support structure shown in FIG. 1.
Figure 4:
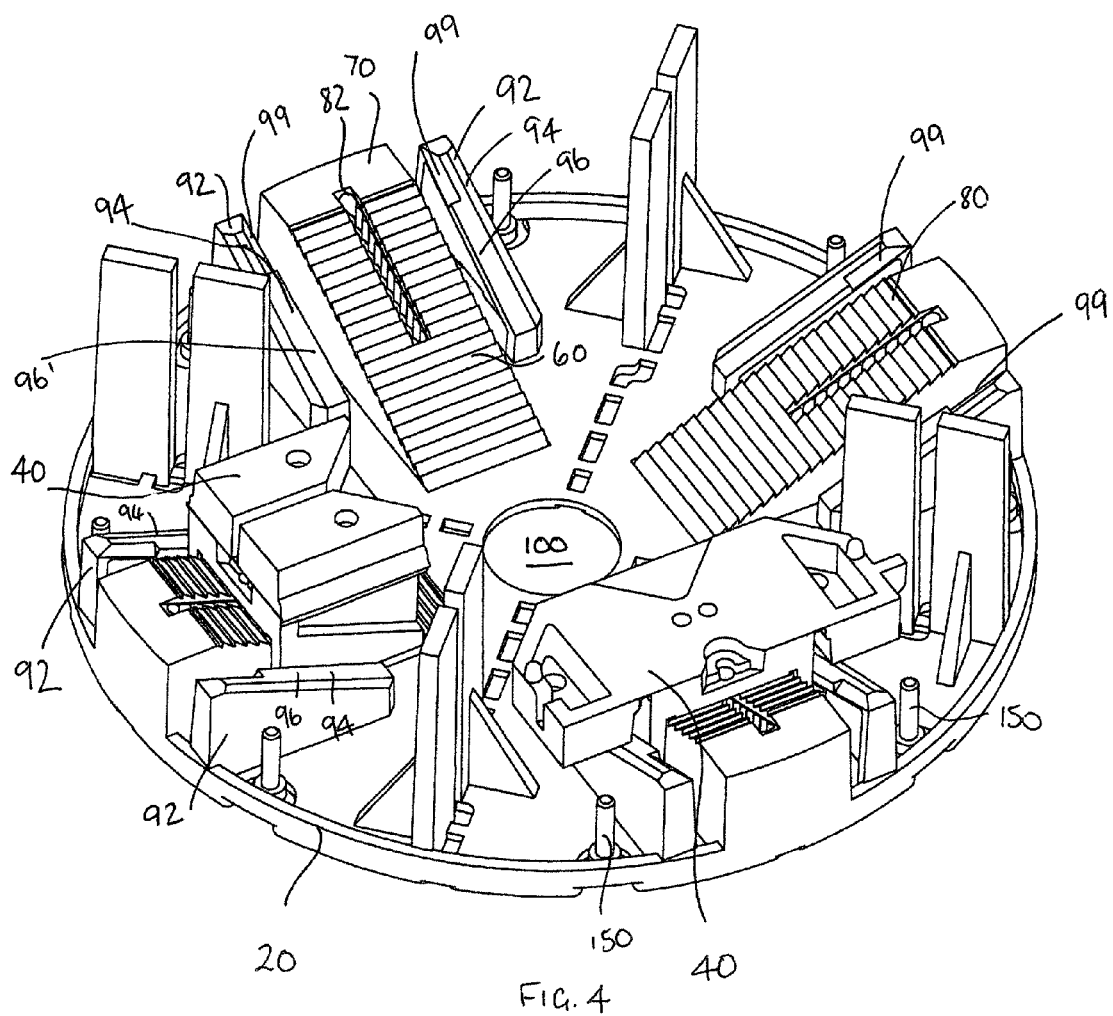
FIG. 4 shows an isometric view of the base member of the support structure shown in FIG. 1 with chocks mounted on two support blocks of the base member.

FIGS. 1 to 3 show an embodiment of a support structure 10 with a circular plate-like base member 20 and four wedge-like support blocks 30. FIG. 4 shows the structure 10 with chocks 40 mounted on top of the support blocks 30. While FIGS. 1 to 3 show the support structure 10 without chocks, and FIG. 4 with two chocks only, in normal use, one chock will be positioned on each support block 30. The support structure includes four pairs of guide pillars 50' and 50".

With reference to FIGS. 3 and 4 in particular, each of the support blocks. 30 has an inclined surface portion 60 and an upper portion in the form of a plateau-like surface portion 70. The plateau-like surface portion 70 can be used to directly support components such as paving slabs, without chocks. A first engagement means in the form of a series of teeth 80 is formed on the inclined surface portion 60. The support blocks 30 also have flat parallel sides 90 which are oriented perpendicular to the base member 20.

As is best seen in FIG. 4, a line 82 of contiguous cylindrical holes extends from the plateau 70 mid way down the inclined surface 60. The holes depend into the support blocks and are sized and shaped to receive a pin 150 in an interference type fit.

A wall 92 is defined on each side of each support block. The wall is trapezoidal in side elevation, having a sloping top 94 which slopes at approximately the same height and angle/incline as the inclined surface of the support block. The top of each wall defines a flange 96 which extends towards the support block. As will be described in more detail below, projections 98 extend from either side of the chocks 40 arranged so that when the chocks are located on a support block, the projections locate below the flanges 96 thus helping to retain the chocks on the support blocks. A gap 99 in the flanges may be provided at the top of the wall to assist in mounting the chocks beneath the flange 96.

As is best seen in FIG. 2, the base member 20 has a central circular hole 100 and is divided into four quadrants 110 by four radial rows 120 of slots 130 extending from near the hole 100 to the perimeter. Short webs between the slots 130 hold the quadrants 110 together and serve as frangible connections. The base member 20 may be broken into halves by snapping the webs between those halves. Each half of the base may then be broken along the next row of slots to form quarters of the original base. One wedge-like support block 30 and two pillars 50' or 50" are formed on each quadrant 110.

Each pillar is positioned symmetrically on one of the straight edges of each quadrant 110. The pillars are rectangular in shape and stand perpendicular to the base member 20. Pairs of adjacent pillars on adjacent quadrants are positioned radially side-by-side such that a first pillar 50' is radially proximal to the central hole 100 of the base and the second pillar 50" is radially distal. The positions of the pillars on each quadrant alternate between the distal and proximal positions from one quadrant to the next. Quadrants with proximal pillars 50' are therefore adjacent to quadrants with distal pillars 50". Each pillar 50 is braced on a first side by a buttress 100 which extends towards the wedge-like block of its quadrant.

A series of eight pins 150 are moulded on the base member 20. The pins may be broken off and used to fix the chocks 40 to the blocks 30 using the holes 82, if required.

Figure 5:
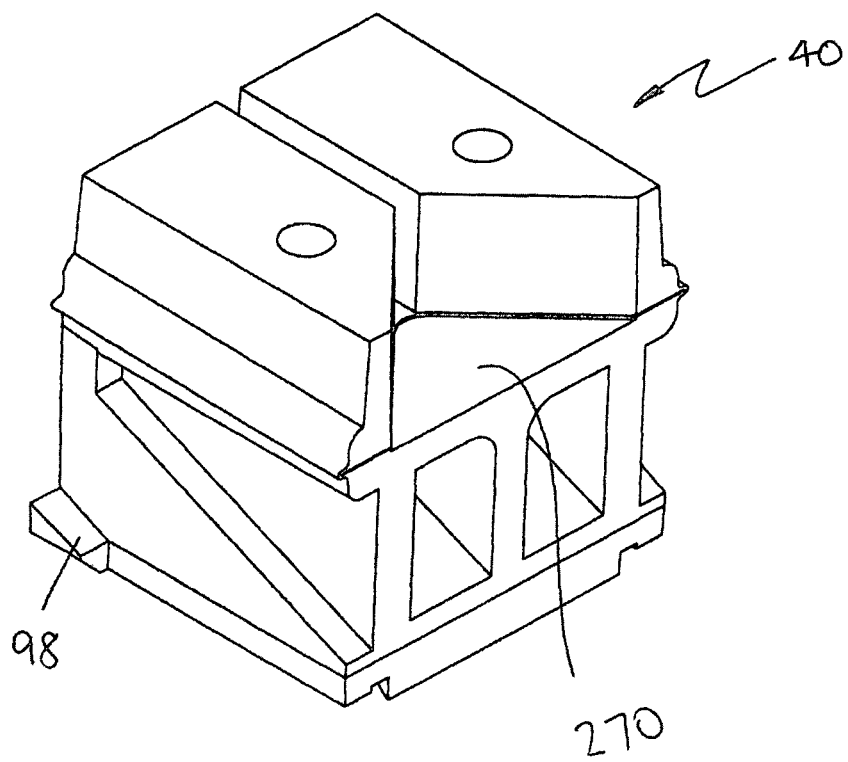
FIG. 5 is an isometric view of a chock with its wings folded on top of the chock.
Figure 6:
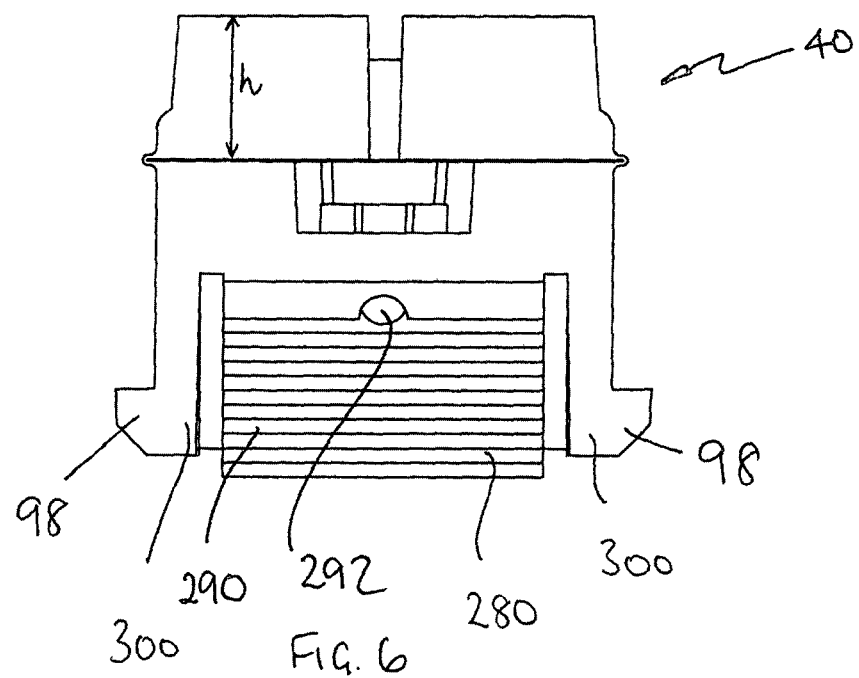
FIG. 6 is an rear view of the chock of FIG. 5.
Figure 7:
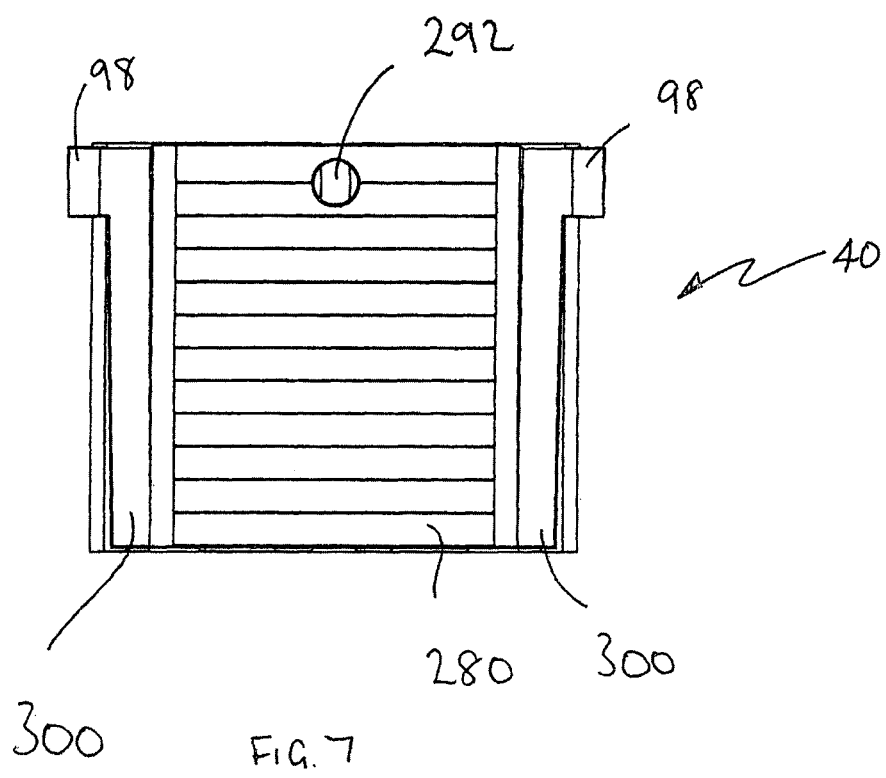
FIG. 7 is an underneath view of the chock of FIG. 5.
Figure 8:
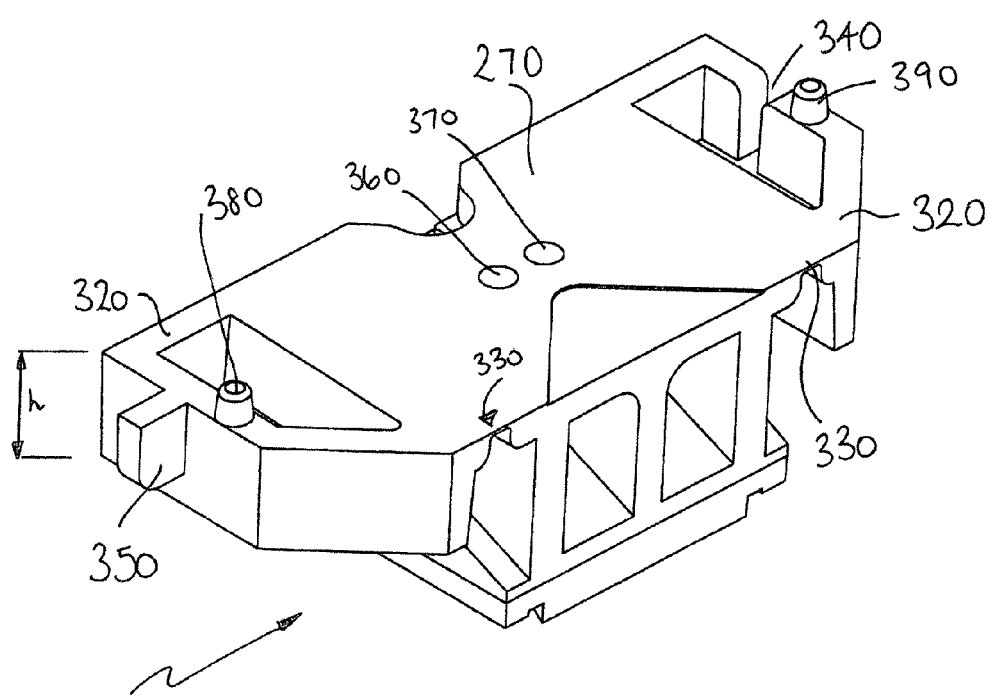
FIG. 8 is an isometric view of the chock with its wings unfolded.

FIGS. 5 to 8 show more detailed views of one of the chocks 40. FIGS. 5 to 7 show the chock in a first orientation, with FIG. 8 showing the chock in a second orientation.

As shown in FIG. 8, the chock has a generally flat upper support surface 270 apart from two small conical protrusions 390. FIGS. 6 and 7 show an inclined lower support surface 280 with teeth 290 formed on it. The inclination of the lower support surface 280 relative to the upper support surface 270 is the same as the inclination of the inclined surface portion 60 of the wedge-like blocks 30 relative to the base member 20. This ensures that when a chock 40 is placed on one of the blocks 30, the upper support surface 270 of the chock is parallel to the base member 20. The teeth 290 formed on the chock 40 have the same profile as the teeth 80 formed on each of the wedge-like support blocks 30, and enable the chock to engage the wedge-like support block without sliding towards the base. In other embodiments, the tooth spacing on each chock may be a multiple of, such as double, the tooth spacing on each of the blocks. It is understood that other known types of engagement means may be used instead of teeth. Also shown in FIGS. 6 and 7 is a hole 292 which is sized to receive one of the pins 150 in an interference fit.

With reference to FIGS. 6 and 7, each of the chocks 40 defines a pair of opposed parallel walls 300 on its underside, one on each side of the teeth 280. A projection 98 protrudes from the outside of each wall In use, when the chocks are placed on the support blocks, the chocks are aligned at the top of the block so that the projections 98 coincide with the gaps 99 in the flanges. When the chock is moved onto the inclined portion the projections 98 locate under the flanges 96 and this prevents the chocks from falling off the inclined portions. A pin 150 can be detached from the support structure 10 and inserted into the hole 292 in the chock and the appropriate hole in the line of holes 82 depending on the position of the chock along the surface 60.

Each chock also defines two further elements in the form of wings 320 which are hinged by a flexible strip of material 330 to the upper surface of the chock. Each wing has a vertical height h (refer to FIG. 6). A slot 340 is defined on one side face of one of the wings and a corresponding protrusion 350 projects from the opposed side face of the other wing. As shown in FIG. 8, two holes 360 and 370 are defined in the upper surface of the chock.

Frusto-conical Protrusions 380 and 390 are defined on the top of each edge of the wings, distal from the chock. As shown in FIGS. 5 and 6, the wings can be rotated about their respective hinges 330. When the wings are located on top of the upper support surface 270, the height of the chock is raised by the height h of the wings. The protrusion 350 engages in slot 340. The frusto-conical protrusions 380 and 390 engage in the holes 360 and 370. When the elements are not located on top of the upper surface the height of the chock is unchanged. The wings are initially an interference fit to the top of the chock, and in use, the weight of the pavers or the like being supported by the chock will hold the wings in place.

In the described embodiment, the height h is about 10 mm. With the existing chock design referred to in the introduction, the possible height range is typically from a 24 mm minimum to about a 35 mm maximum when the chock is at the maximum height on the inclined surface. In contrast, in the present invention by enabling an increase in the height of the chock, the height range of the paver support is increased from 24 mm to about 45 mm which is approaching a 100% height increase.

In this embodiment, everything except the chocks is injection moulded as one integral structure. Each of the chocks 40 are injection moulded as separate pieces. All parts of this embodiment of the support structure 10 will typically be made from UV-stabilised polypropylene, but other known plastics materials may also be used as appropriate.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A support structure for supporting an, upper member such as a paving slab or paver, the support structure comprising:
   a base member having an underside, and an upper-side, a plurality of support blocks being formed on the upper-side, each support block defining an inclined surface portion which is inclined relative to the underside and which includes first engagement means; and
   one or more chocks positionable on one of the inclined surfaces, each chock including an upper surface for supporting the upper member and a second engagement means for engaging the first engagement means of a support block and securing the chock against displacement towards the base member, and wherein the chock includes wings hinged to opposite sides of the chock adjacent the upper surface, the arrangement being such that when the wings are located on top of the upper surface, the height of the chock is raised by the height of the wings and when the wings are not located on top of the upper surface, the height of the chock is unchanged, thus increasing the range of different heights which may be provided by the support structure.

2. A support structure as claimed in claim 1 wherein the wings include fixing means for fixing the wings to each other or to the upper surface of the block when the wings are located on top of the support block.

3. A support structure as claimed in claim 2 wherein the fixing means comprise a slot defined on one side face of one wing and a protrusion projecting from the opposed side face of the other wing which locates in the slot.

4. A support structure as claimed in claim 1 wherein a wall is defined on each side of each support block and wherein the top of the wall slopes at approximately the same height and inclination as the inclined surface of the support block.

5. A support structure as claimed in claim 4 wherein a flange is defined at the top of each wall facing the support block.

6. A support structure as claimed in claim 5 wherein projections extend from either side of the chocks arranged so that when the chocks are located on a support block the projections locate below the flanges thus helping to retain the chocks on the support blocks.

7. A support structure as claimed in claim 6 wherein a gap is defined in the flange at the top of the wall.

8. A support structure as claimed in claim 1 wherein a series of cylindrical holes are defined in each inclined surface of the base member.

9. A support structure as claimed in claim 8 wherein a cylindrical projection is mounted in the underside of one or more chocks for securing the chock to the inclined surface using one of the cylindrical holes.

10. A support structure as claimed in claim 1 wherein the first and second engagement means consist of interlocking teeth.

11. A support structure as claimed in claim 1 wherein the base member is divided into four sections joined by frangible connectors, each section including one support block and guides for positioning the base member relative to the upper members.

12. A support structure as claimed in claim 1 wherein a circular hole is defined in the centre of the base member.

13. A chock for use with a base member of a paver support, the chock including an upper surface for supporting a paver and an engagement means for engaging an engagement means of the base member and securing the chock on the base member in a plurality of positions at different heights, wherein the chock includes wings which are hinged to opposite sides of the chock adjacent the upper surface of the chock, the arrangement being such that when the wings are located on top of the upper surface, the height of the chock is raised by the height of the wings and when the wings are not located on top of the upper surface, the height of the chock is unchanged, thus increasing the range of different support heights which may be provided by the base member when the chock is mounted thereon.

14. A support structure as claimed in claim 13 wherein the wings include fixing means for fixing the wings to each other or to the upper surface of the block when the wings are located on top of the support block.

15. A support structure as claimed in claim 14 wherein the fixing means comprise a slot defined on one side face of one wing and a protrusion projecting from the opposed side face of the other wing which locates in the slot.

* * * * *